United States Patent [19]
Wen et al.

[11] Patent Number: 6,110,625
[45] Date of Patent: Aug. 29, 2000

[54] METHODS FOR MANUFACTURING COLOR FILTERS

[75] Inventors: Chun-Hsiang Wen; Shu-Huei Cheng; Hua-Chi Cheng, all of Hsinchu; Yaw-Ting Wu, Ping-Chen; Ming-Shiang Jan, Chutung; Pao-Ju Hsieh, Keelung, all of Taiwan; Jun-Ichi Yasukawa, Chigasaki; Hajime Kuwahara, Narashino, both of Japan

[73] Assignees: Industrial Technology Research Institute, Hsinchu, Taiwan; Sumitomo Chemical Company, Ltd., Tokyo, Japan

[21] Appl. No.: 09/248,375

[22] Filed: Feb. 10, 1999

[51] Int. Cl.⁷ .............................. G02B 5/20; G02F 1/1335
[52] U.S. Cl. ................................................................. 430/7
[58] Field of Search .................................. 430/7, 321, 394

[56] References Cited

U.S. PATENT DOCUMENTS

| | | | |
|---|---|---|---|
| 5,186,801 | 2/1993 | Matsumura et al. | 204/181.1 |
| 5,478,681 | 12/1995 | Yamasita et al. | 430/7 |
| 5,641,595 | 6/1997 | Hsieh et al. | |
| 5,645,970 | 7/1997 | Cheng et al. | |

*Primary Examiner*—John A. McPherson
*Attorney, Agent, or Firm*—Alston & Bird LLP

[57] ABSTRACT

The invention relates to a method for manufacturing color filters utilizing a color electrodeposition coating which contains an anionic electrodeposition resin having a low acid value. Said method comprises coating a layer of positive photoresist onto a transparent electrically conductive substrate, exposing the substrate under a photomask or photomasks to form regions of different initial levels of exposure energy, exposing the entire surface of the substrate through an energy-incrementing way to, progressively, allow all regions of the substrate to achieve an energy sufficient to completely expose the photoresist on each corresponding region, developing stepwise each region with a same developer solution to cause the electrically conductive substrate of the corresponding region uncovered, electrodepositing said region with a color electrodeposition coating containing an anionic electrodeposition resin having a low acid value to finish the pixel arrangements of the desired colors and completely exposing the substrate. The low acid value anionic electrodeposition resin utilized in the invention has an acid value of 1 to 70 mg KOH/g. The method of the invention shows the advantages of having a high degree of freedom in pattern figures and a wide process window. Moreover, the manufacture color filters of large surface and the perfect yield rate of products are possible.

18 Claims, 3 Drawing Sheets

METHODS FOR MANUFACTURING COLOR FILTERS

BACKGROUND OF THE INVENTION

Flat panel displays (FPD) are products in the photoelectric industry, which combine the techniques of semiconductors, optics and chromatics. A trend is becoming increasingly recognizable in that FPD is gradually taking the place of the traditional cathode ray tubes (CRT). Among various flat panel displays, liquid crystal displays (LCD) have assumed a leading position, because of their light weight, thinness and capability of becoming a full-color display. Color filters are the key elements to render glistening and vivid pictures.

A color filter comprises three main components: a black-hued matrix, a color filter layer and an overcoat. Currently, commercial methods for manufacturing color filters include:

(1) dyeing,
(2) etching,
(3) pigment dispersion,
(4) electrodeposition, and
(5) printing.

The dyeing method and the etching method primarily utilize dyes as the essential filtering materials. The advantages of using dyes as the essential filtering materials lie in their variant species, homogeneous chroma, high dyeability, high color intensity and high light transmissibility. Suitable dyes are disclosed in U.S. Pat. Nos. 4,820,619 and 4,837,098. Because of the relatively inadequate light and heat resistance of the dyeing materials, the methods of dyeing and etching have been largely replaced by the pigment dispersion method and the electrodeposition method that use pigments as the essential filtering materials. Pigments have superior light and heat resistance. One simply has to utilize a general pigment dispersion technique to control the particle size of the pigment to be less than 0.1 $\mu$m, these two methods will enable pigments to perform color intensity and light transmissibility close to or even the same as dyes perform. Due to the above, the pigment dispersion method and the electrodeposition method have become the major methods on which industries rely in the manufacture of color filters.

Pigment dispersion methods, such as those disclosed in U.S. Pat. Nos. 5,085,973 and 4,786,148 and Japan Laid-Open Patent Publication No. 60-129739, involve the use of a photosensitive resin well dispersed in pigments and a photolithography technique to achieve a high resolution and a flexibility of pattern design. This method is currently the major manufacturing technique. However, due to the factors that (1) the efficacy of the materials is low (1%~2%), (2) the trend of applying to large sizes corresponding glass substrates is low and (3) the chances of using an expensive precisely aligning machine are quite frequent, the cost of production for such a method fails to comply with the trends of large sizes of color liquid displays and of lower prices.

Electrodeposition coating processes, such as that disclosed in U.S. Pat. No. 4,812,387, use an electrophoresis technique to electrodeposite an electrodeposition resin and a pigment which are both well dispersed in water onto a patterned transparent electrode substrate. A filter layer of a uniform thickness and of a good smoothness is obtained. The electrodeposition coating technique is limited in its applications. Owing to the design of the electrodes, electrodeposition coating process can only use a substrate with a stripe pattern of conductive film for implementation. Thus, it is impossible to arrange pixels freely.

Among all the processes for manufacturing color filters, the printing process is the least expensive process. However, it suffers from the problems of poor dimensional precision, smoothness and reliability. Printing processes are not well accepted by industries for making high quality electronic products, but are generally used in the manufacture of low-end products.

To address the problems and at the same time to preserve the advantages of pigment dispersion and electrodeposition coating process, Nippon Oil Company proposed an electrodeposition lithographic method (ED-litho) for making color filters which combined the electrodeposition (ED) coating method and the lithographic (litho) technique. As disclosed in U.S. Pat. Nos. 5,214,541 and 5,214,542, the contents of which are incorporated herein by reference, Nippon Oil Company discloses foremost an electrodeposition lithographic method. Said method involves the steps of exposing a photoresist layer on a transparent electrically conductive layer under a photomask having patterns of more than three different degrees of light transmittances for one time to form regions of different degrees of exposure energy, using different developer solutions to remove the photoresist layer stepwise and electrodepositing progressively the red, green and blue colors onto the exposed electrically conductive substrate. The electrodeposition lithographic method discussed above has several advantages:

(1) The method combines the techniques of electrodeposition and lithography. Therefore, high precision patterns can be obtained, better than that obtainable from the electrodeposition coating method;

(2) The pattern figure has a high degree of freedom, and both stripe and non-stripe patterns can be provided; and (3) Because it utilizes the advantageous characteristics of an electrodeposition process, the coated films exhibit uniform film thickness and excellent smoothness.

However, the electrodeposition lithographic method requires developer solutions of at least three different levels of concentrations so as to selectively remove the exposed photoresist at different stages of the development process and to electrodeposite the colors of red, green and blue (R, G, B) thereunto, thus it allows only a relatively narrow process window within which tolerance is acceptable. Moreover, it is known to use basic aqueous developer solutions for positive photoresist. Under such circumstances, there exist only very limited options in selecting an appropriate electrodeposition resin. Additionally, there still exists photoresist on the substrate before the electrodeposition of all desired colors is accomplished. Thus, a culing (hardened) procedure at elevated temperature is impossible. In the examples of this reference, a color electrodeposition coating comprising an anionic electrodeposition resin is used. The acid value of said resin is in the range of from 100 to 500 mg KOH/g. Such type of anionic electrodeposition resin is easily influenced by developer solutions. Therefore, developer solutions of higher concentrations can not be applied. This results in a narrow tolerance of developer solutions. Although cationic electrodeposition resins have better basic resistance, they show the disadvantages of be easily yellowed and having a lower transmission. During the electrodepositing process, such type of resin tends to reduce the indium tin oxide (ITO), which is a commonly used transparent electrically conductive material of the transparent electrically conductive substrate, to black spots. The above recited technical limits are believed to be the main reasons why there are no commercialized products produced from the process.

Another method for making color filters which combined a electrodeposition (ED) coating method and a lithographic (litho) technique is disclosed in U.S. Pat. No. 5,641,595. The contents of said patent are incorporated herein by reference. Said method is characterized by utilizing the energy accumulate characteristic of positive photoresist in combination with light-curable electrodeposition resins. Said process involves the steps of coating a layer of positive photoresist onto a transparent electrically conductive substrate and exposing the positive photoresist layer to form regions of different initial levels of exposure energy. One of the regions reaches the full exposure energy of the positive photoresist. After a developing step, the photoresist on this region is removed and the corresponding electrically conductive substrate is uncovered. Said region is then electrodeposited to form the desired colors. When all steps of the method are accomplished, the substrate is subjected to an exposing step without alignment. The pixels electrodeposited previously are then cured by light. This step can avoid the electrodeposited color from being attacked by the developer solution used in the next stage. The regions which have not accumulated sufficient amounts of energy are subject to next exposure to ensure that the energy of the second region reaches the full exposure energy of said positive photoresist. After that, each region is developed with developer solution and electrodeposited with the desired color. Repeat the above steps until the arrangement of all the pixels is accomplished.

This energy incremental process possesses the function of developing the regions of different levels of exposure energy progressively. Because the method combines the advantages of using the photocurable anionic electrodeposited resins, making up the exposure energy to allow each region to reach the full exposure energy of the positive photoresist, and curing the film formed by the electrodeposition coating, the influence of the basic developer solution subsequently used on the electrodeposited pixels is eliminated and the developing step is simplified. However, the photocurable electrodeposited resins require a sufficient amount of exposure energy to cure the electrodeposited coating so as to defend against the attack of developer solutions. In order to possess a filtering function, pigment particles are dispersed into the electrodeposited coating. Thus, the energy need to expose the coating becomes even greater. This narrows the exposure tolerance of the photoresist. Moreover, the addition of photosensitive groups in the electrodeposited coating enhances the difficulty to achieve well dispersion and stability, and adversely influences the yield rate of the products.

The present invention intends to overcome the problems and to preserve the advantages of pigment dispersion and electrodeposition coating process for manufacturing color filters. The invention develops an excellent technique for manufacturing color filters by using a color electrodeposition coating containing an anionic electrodeposition resin having a low acid value in combination with a weak basic developed positive photoresist. Since the present invention utilizes an anionic electrodeposition resin having a low acid value in combination with a weak basic developed positive photoresist solution, the pixels of the corresponding regions electrodeposited previously can be baked at a normal drying temperature so as to defend against the attack of developer solutions used subsequently for developing other desired colors of pixels without influencing the functions of the photoresists. The method of the invention shows the advantages of having a high degree of freedom in pattern figures and a wide process window. Moreover, the manufacture color filters of large surface and a perfect yield rate of products are possible.

SUMMARY OF THE INVENTION

The invention relates to a method for manufacturing color filters utilizing a color electrodeposition coating which contains an anionic electrodeposition resin having a low acid value. Said method comprises coating a layer of positive photoresist onto a transparent electrically conductive substrate, exposing the substrate under a photomask or photomasks to form regions of different initial levels of exposure energy, exposing the entire surface of the substrate through an energy-incrementing way to, progressively, allow all regions of the substrate to achieve an energy sufficient to completely expose the photoresist on each corresponding region, developing stepwise each region with a same developer solution to cause the electrically conductive substrate of the corresponding region uncovered, electrodepositing said region with a color electrodeposition coating containing an anionic electrodeposition resin having an low acid value to finish the pixel arrangements of the desired colors and completely exposing the substrate. The low acid value anionic electrodeposition resin utilized in the invention has an acid value of 1 to 70 mg KOH/g.

The method of the invention shows the advantages of having a high degree of freedom in pattern figures and a wide process window. Moreover, the manufacture color filters of large surface and the perfect yield rate of products are possible.

BRIEF DESCRIPTION OF THE DRAWINGS

FIG. 1A($a$) to 1A($f$) is a schematic diagram showing the various stages of a process for manufacturing color filters in accordance with the present invention in which the transparent electrically conductive substrate has been arranged with a black-hued matrix.

FIG. 1B($a$) to 1B($f$) is a schematic diagram showing the various stages of another process for manufacturing color filters in accordance with the present invention in which the transparent electrically conductive substrate has been arranged with a black-hued matrix.

FIG. 2($a$) to 2($f$) is a schematic diagram showing the various stages of another process for manufacturing color filters in accordance with the present invention in which the transparent electrically conductive substrate has not been arranged with a black-hued matrix.

DETAILED DESCRIPTION OF THE INVENTION

The invention relates to a method for manufacturing color filters comprising the steps of:

(a) coating a layer of positive photoresist onto a transparent electrically conductive substrate, and exposing the positive photoresist layer to form three or four regions of different initial levels of exposure energy, wherein the exposure energy of each region is $D_1$, $D_2$, $D_3$ (and $D_4$) progressively, $D_1$ represents the full exposure energy of the positive photoresist, and $D_1 > D_2 > D_3 (> D_4)$;

(b) using a developer solution to develop and to remove the region of the photoresist layer with the exposure energy of $D_1$ to thereby cause a corresponding area of the electrically conductive substrate underlying the photoresist to be uncovered, and electrodepositing said region with a color electrodeposition coating containing a low acid value anionic electrodeposition resin having an acid value of lower than 70 mg KOH/g so as to finish the pixel arrangement of a desired color;

(c) exposing the entire surface of the substrate with an energy $IE_n$ to impart an incremental amount of energy to all regions of the substrate, wherein $IE_n$ is the energetic difference between $D_n$ and $D_{n+1}$ and the definition of n is below:

(i) when three regions of different initial levels of exposure energy are formed on the substrate, n is 1 and 2 progressively, or (ii) when four regions of different initial levels of exposure energy are formed on the substrate, n is 1, 2 and 3 progressively;

(d) after each time of exposure in steps (c)(i) or (ii), using the same developer solution of step (b) to develop and to remove the photoresist of the region achieving full exposure to thereby cause the corresponding area of the electrically conductive substrate of underlying the photoresist to be uncovered, and then electrodepositing said region with a color electrodeposition coating containing an anionic electrodeposition resin having a low acid value to finish the pixel arrangements of other desired colors;

(e) repeating steps (c) and (d) until all of the pixel arrangements are accomplished; and (f) forming an overcoat on the substrate.

The transparent electrically conductive substrate of the invention can be selected from the group consisting of oxides of tin, indium and antimony, such as indium tin oxide(ITO), and mixtures thereof; or a commercialized electrically conductive glass.

The materials for forming the black-hued matrix can be alloys or oxides of chromium, nickel, etc., or mixtures thereof. Alternatively, the black-hued matrix can be formed from an organic polymeric coating composition containing black pigments dispersed therein. For example, the materials can be electrically conductive, such as acrylate resins and epoxy resins, or non-electrically conductive.

The positive photoresist (PR) to be used in the invention can be selected from the group consisting of novolak resins and naphthyoquinone diazide compounds and the derivatives thereof. Suitable positive photoresists are those disclosed in U.S. Pat. No. 5,645,970. The energy-accumulable quantity of those materials allows the regions of different initial exposure energy to be progressively developed. A positive photoresist works based on the principle that its solubility increases after being exposed to photoenergy, thus it becomes capable of being developed by a basic solution. The precise reliability of patterns of photoresists is high and the size accuracy is perfect. Preferably, the photoresist for use in the process of the present invention should have high contrast so as to minimize the film loss in the unexposed or underexposed areas.

The techniques for coating photoresists can be any that conventionally known to persons skilled in the art such as spraying, dip coating, screen printing, roll coating, spin coating. Preferably, the photoresist layer has a thickness of 1 to 10 $\mu$m, more preferably 1.5 to 5 $\mu$m.

If the photoresist layer form three regions of different degrees of exposure energy after exposing, the exposure energy of each region, $D_1$, $D_2$ and $D_3$ represents from 100% to 40%, from 85% to 20% and from 70% to 0%, respectively. Preferably, each $D_1$, $D_2$ and $D_3$ represents from 100% to 70%, from 70% to 40% and from 40% to 0%, respectively. If the photoresist layer form four regions of different degrees of exposure energy after exposing, the exposure energy of each region, $D_1$, $D_2$, $D_3$ and $D_4$, represents from 100% to 40%, from 85% to 20%, from 70% to 5% and from 50% to 0%, respectively. Preferably, each $D_1$, $D_2$, $D_3$ and $D_4$, represents from 100% to 80%, from 80% to 50%, from 50% to 30% and from 30% to 0%, respectively.

The energy of full exposure required in a photoresist manufacture is between 80 and 1500 mJ/cm$^2$. It can be done via a single exposure step using a photomask having multiple exposure density. Alternatively, it can be accomplished using a photomask having a predetermined exposure pattern. By careful movements of the photomask, regions of different degrees of exposure energy can be formed on the photoresist. Another alternative procedure is to use a plurality (three or four) of photomasks to form the desired three regions of different degrees of initial exposure energy which can be sequentially developed using the incremental exposure method disclosed in the present invention. The regional pattern can be stripe or non-stripe (such as mosaic or triangle, etc.) freely arranged one.

A positive photoresist is typically developed by a basic developer solution, such as the aqueous solutions of sodium carbonate, sodium hydrogen carbonate, sodium silicate, tetraalkyl amine compounds, sodium hydroxide, potassium hydroxide, and mixtures thereof. The concentration of the developer solution generally ranges from 0.1 to 10 wt %, preferably from 0.2 to 4 wt %. The developing temperature is generally from 10° to 70° C., preferably from 15° to 40° C. The time needed for the developing step is typically from 5 to 600 seconds.

Crosslinkable curing agents, organic solvents, neutralization agents and a coloring agent consisting of a dye, a pigment, or a mixture thereof can be added into the color electrodeposition coating containing an anionic electrodeposition resin having a low acid value used in the present invention.

The low acid value anionic electrodeposition resin used in the present invention is preferably a polyester resin having carboxyl groups. The resin can be dissolved or dispersed in a neutralization agent. Preferably, said resin has an acid value of lower than 70 mg KOH/g, preferably from 20 to 70 mg KOH/g, and a solid content of about 75%. The monomers consisting of the polyester resin may comprise those selected from the group consisting of neopentyl glycol, adipic acid, isophthalic acid, isodecanol, trimellitic anhydrate, butyl cellosolve and 2-butanol.

The neutralization agent can be selected from the group consisting of dimethyl ethanol amine, diethyl ethanolamine, diisopropanolamine, triethylamine and the mixtures thereof. Crosslinkable curing agents suitably for use in the invention can be selected from the group consisting of methylation melamine resin, butylation melamine resin, methylation methanol melamine resin, butylation methanol melamine resin, benzoguanamine resin.

The coloring agent of the present invention can be a dye, a pigment, or a mixture thereof. Typically, an appropriate dye can be selected from the group consisting of azo dyes, anthraquinone dyes, benzodifuranone dyes, condensed methine dyes, and mixtures thereof. The pigment can be selected from the group consisting of azo lake organic pigments, quinacridone organic pigments, phthalocyanine organic pigments, isoindolinone organic pigments, anthraquinone organic pigments, thioindigo organic pigments, chrome yellow, chrome blue, iron oxide, chrome vermilion, chrome green, ultramarine, Prussian blue, cobalt green, emerald green, titanium white, carbon black, and mixtures thereof.

According to the process of the present invention, when three regions of different degrees of exposure energy are formed on the substrate, the substrate is pre-arranged with black-hued matrixes, and selectively or progressively coated with the color electrodeposition coating containing red, green and blue. When four regions of different degrees of exposure energy are formed on the substrate, a black resin is electrodeposited onto the last region (the fourth region) after the color electrodeposition coating containing red, green and blue be selectively or progressively electrodeposited. The developing and full-exposing steps can be repeated until all of the pixels arrangements are accomplished. When all of the pixels arrangements are accomplished in accordance with the invention, the substrate is preferably baked to allow the electrodeposition resin to be cured completely.

Anionic electrodeposition resins show excellent storage stability (the property of not turning yellow), emulsification stability and pigments disperibility (in particularly the pigments disperibility at high concentration). When anionic electrodeposition resin is used in combination with photoresist, there still exists the photoresist on the substrate before the electrodeposition of all desired colors is accomplished. There is no way to conduct a thermal-curing procedure at elevated temperature. For anionic electrodeposition resin, the possibility of being attacked by developer solutions used subsequently still exists.

To avoid such a disadvantage, the invention uses a color electrodeposition coating containing an anionic electrodeposition resin having an acid value of lower than 70 mg KOH/g in combination with a weak basic developed positive photoresist solution. The method of the invention utilizes an energy incremental way and develops the photoresist stepwise with developer solution of one single concentration. After the corresponding region of the electrically conductive substrate is uncovered, the region is electrodeposited with a color to arrange the pixel. In a word, the present invention is characterized by using an electrodeposition coating containing an anionic electrodeposition resin having an acid value of lower than 70 mg KOH/g in combination with a positive photoresist technique possessing an energy incremental function. For example, the weak basic developed positive photoresist solution disclosed in U.S. Pat. No. 5,645,970 can be used. Therefore, the pixels of the corresponding regions electrodeposited previously can be baked at a normal drying temperature such as from 80 to 120° C. so as to defend the attack of developer solutions used subsequently for developing other desired colors of pixels without influencing the functions of the photoresists.

The method of the invention shows the advantages of having a high degree of freedom in pattern figures and a wide process window. Moreover, the manufacture color filters of large surface and the perfect yield rate of products are possible.

Figure 1A:
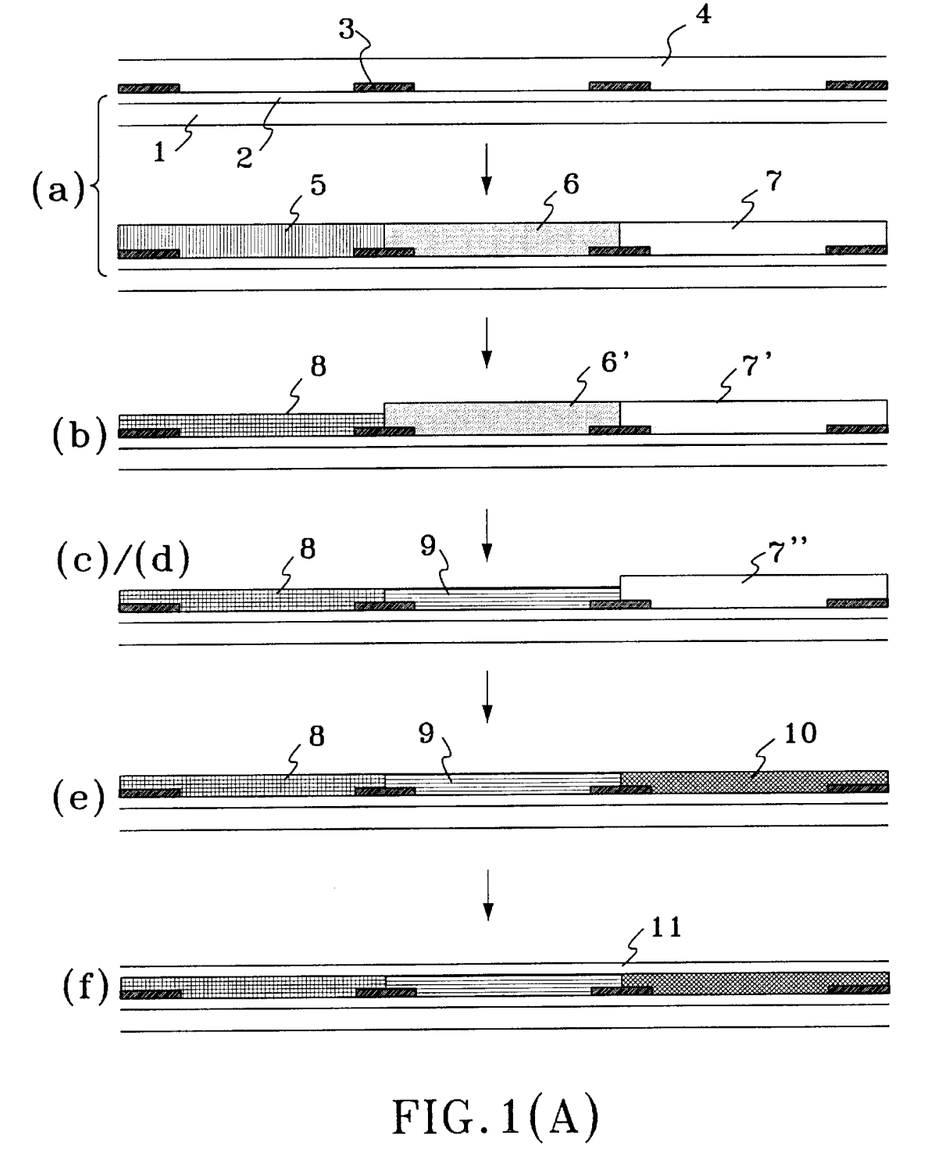
Figure 1B:
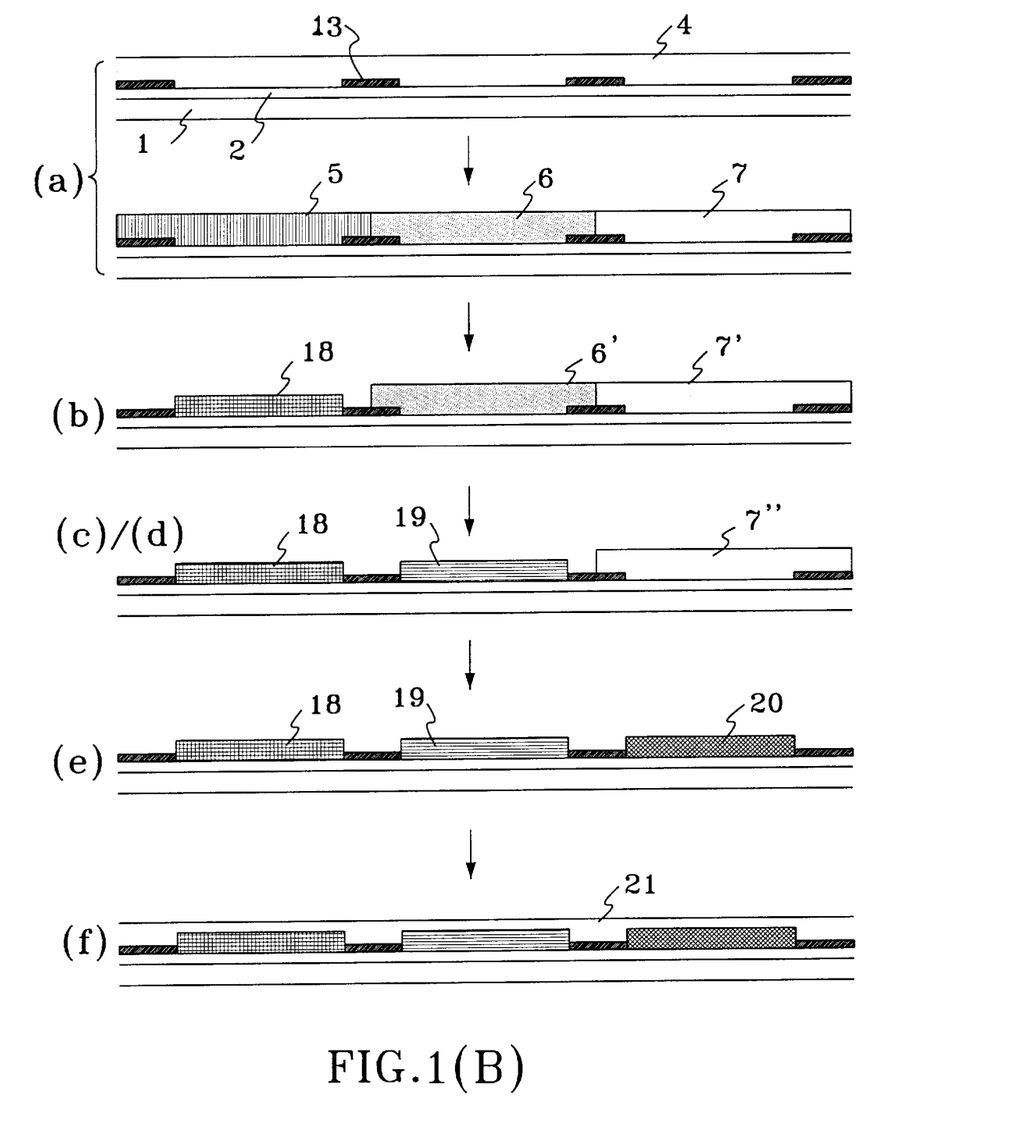

Each of FIGS. 1A and 1B represents a preferred embodiment in accordance with the present invention. Both of the two embodiments are directed to a method for making color filters in which the transparent electrically conductive substrate has been arranged with a black-hued matrix. Said method comprises the following steps:

1. pre-forming, a black-hued matrix on a transparent electrically conductive substrate (2); said black-hued matrix can be made from a conductive material or a non-conductive material as shown in (3) of FIG. 1A(a) and (13) of FIG. 1B(a) respectively;
2. coating a layer of positive photoresist onto a transparent electrically conductive substrate (2) and exposing the photoresist layer under a photomask or photomasks to form three regions of different initial levels of exposure energy, wherein the exposure energy of each region is $D_1(5)$, $D_2(6)$ and $D_3(7)$ respectively, wherein $D_1$ represents the full exposure energy of the positive photoresist and $D_1 > D_2 > D_3$, as shown in FIG. 1A(a) and FIG. 1B(a);
3. using a developer solution to develop and to remove the region of the photoresist layer with the exposure energy of $D_1$ (5) to thereby cause a corresponding area of the electrically conductive substrate underlying the photoresist to be uncovered, and electrodepositing said region with a color electrodeposition coating containing an anionic electrodeposition resin having a low acid value, namely, conducting the electrodepositing arrangement of the first pixel (8), as shown in FIG. 1A(b) and FIG. 1B(b);
4. exposing the entire surface of the substrate with an energy $IE_1$ to impart an incremental amount of energy to all regions of the substrate, wherein $IE_1$ is the energetic difference between $D_1$ and $D_2$ in other words, $IE_1 = D_1 - D_2$), at this moment, the exposure energy of the region whose initial exposure energy is $D_2(6)$ has been accumulated to the amount of full exposure $(D_2 + IE_1 = D_1)(6')$, and the exposure energy of the region whose initial exposure energy is $D_3(7)$ has not been accumulated to the amount of full exposure (only $D_3 + IE_1$)(7'), as shown in FIG. 1A(b) and FIG. 1B(b);
5. using the same developer solution as that of step 3 to develop and to remove the photoresist of the region achieving full exposure (6') to thereby cause the corresponding area of the electrically conductive substrate underlying the photoresist to be uncovered, and electrodepositing said region with a color electrodeposition coating containing an anionic electrodeposition resin having a low acid value, namely, conducting the electrodepositing arrangement of the second pixel (9, 19), as shown in FIG. 1A(c)/(d) and FIG. 1B(c)/(d);
6. exposing the entire surface of the substrate with an energy $IE_2$ to impart an incremental amount of energy to all regions of the substrate, wherein $IE_2$ is the energetic difference between $D_2$ and $D_3$ in other words, $IE_2 = D_2 - D_3$), at this moment, the exposure energy of the region whose initial exposure energy is $D_3$ (7) has been accumulated to the amount of full exposure $(D_3 + IE_1 + IE_2 = D_1)$ (7"), as shown in FIG. 1A(c)/(d) and FIG. 1B(c)/(d);
7. using the same developer solution as that of step 3 to develop and to remove the photoresist of the region achieving full exposure (7") to thereby cause the corresponding area of the electrically conductive substrate underlying the photoresist to be uncovered and electrodepositing said region with a color electrodeposition coating containing an anionic electrodeposition resin having a low acid value, namely, conducting the electrodepositing arrangement of the third pixel (10, 20) and baking the substrate at an elevated temperature to allow the pixels (figures) to be cured completely, as shown in FIG. 1A(e) and FIG. 1B(e);
8. finally, forming an overcoat (11, 21) on the substrate to protect the colored filter, as shown in FIG. 1A(f) and FIG. 1B(f).

Figure 2:
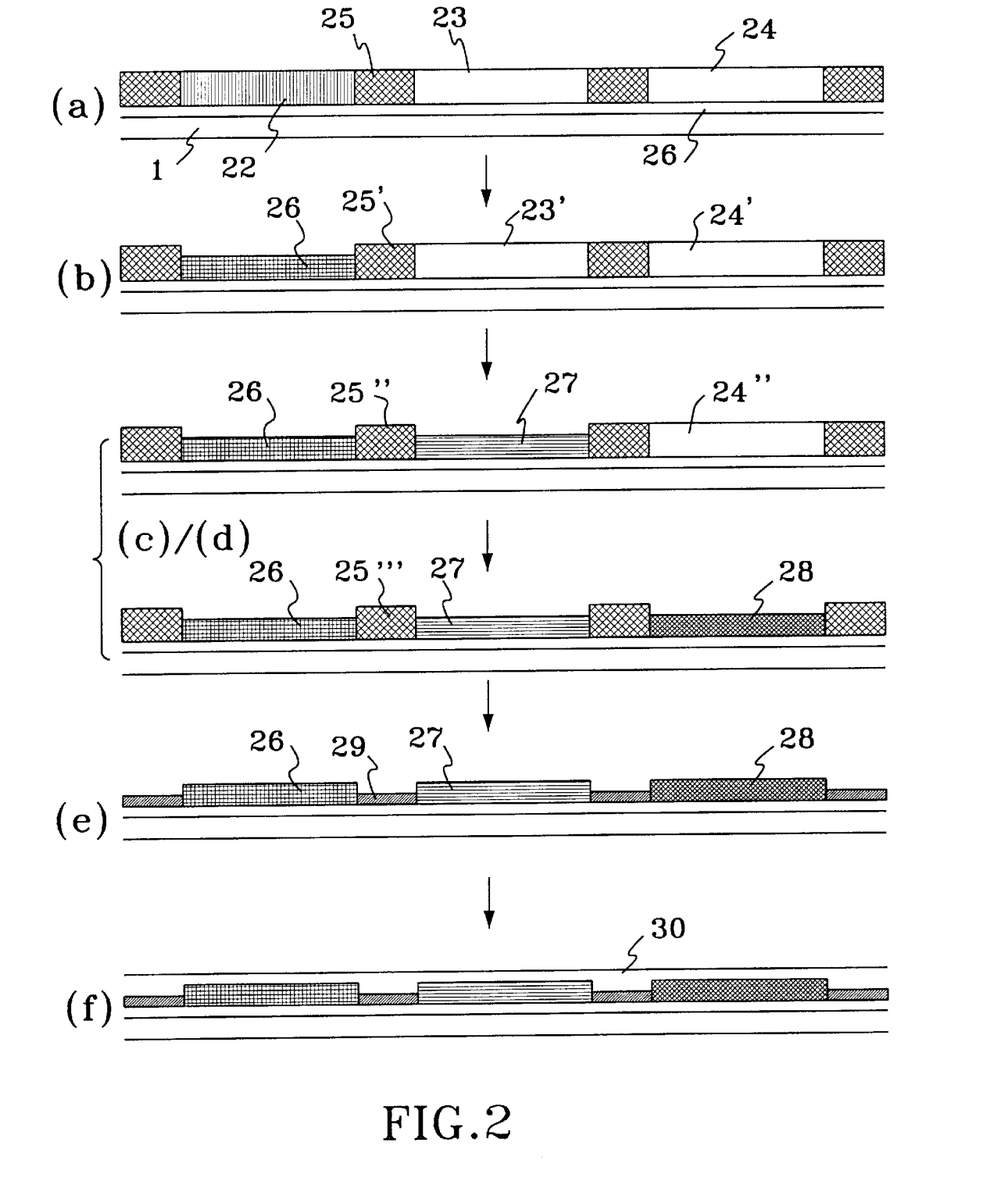

FIG. 2 is a schematic diagram showing the various stages of another process for manufacturing color filters in accordance with the present invention in which the transparent electrically conductive substrate is not been arranged with a black-hued matrix. Said method comprises the following steps:

1. coating a layer of positive photoresist onto a transparent electrically conductive substrate (2) and exposing the photoresist layer under a photomask or photomasks to form four regions of different initial levels of exposure energy, wherein the exposure energy of each region is $D_1(22)$, $D_2(23)$, $D_3(24)$ and $D_4(25)$ respectively, wherein $D_1$ represents the full exposure energy of the positive photoresist and $D_1 > D_2 > D_3 > D_4$, as shown in FIG. 2(a);
2. using a developer solution to develop and to remove the region of the photoresist layer with the exposure energy of $D_1$ (22) to thereby cause a corresponding area of the electrically conductive substrate underlying the photoresist to be uncovered, and electrodepositing said region with a color electrodeposition coating containing an anionic electrodeposition resin having a low acid value, namely, conducting the electrodepositing arrangement of the first pixel (26), as shown in FIG. 2(b);

3. exposing the entire surface of the substrate with an energy $IE_1$ to impart an incremental amount of energy to all regions of the substrate, wherein $IE_1$ is the energetic difference between $D_1$ and $D_2$ namely, $IE_1=D_1-D_2$), at this moment, the exposure energy of the region whose initial exposure energy is $D_2$(23) has been accumulated to the amount of full exposure $(D_2+IE_1=D_1)$(23'), and the exposure energies of the regions whose initial exposure energy is $D_3$(24) and $D_4$(25) respectively have not been accumulated to the amount of full exposure [only $(D_3+IE_1)$(24') and $(D_4+IE_1)$(25') respectively], as shown in FIG. 2(b);

4. using the same developer solution as that of step 3 to develop and to remove the photoresist of the region achieving full exposure (23') to thereby cause the corresponding area of the electrically conductive substrate of underlying the photoresist to be uncovered, and electrodepositing said region with a color electrodeposition coating containing an anionic electrodeposition resin having a low acid value, namely, conducting the electrodepositing arrangement of the second pixel (27), as shown in FIG. 2(c)/(d);

5. exposing the entire surface of the substrate with an energy $IE_2$ to impart an incremental amount of energy to all regions of the substrate, wherein $IE_2$ is the energetic difference between $D_2$ and $D_3$ namely $IE_2=D_2-D_3$), at this moment, the exposure energy of the region whose initial exposure energy is $D_3$ (24) has been accumulated to the amount of full exposure $(D_3+IE_1+IE_2=D_1)$(24"), however, the exposure energy of the region whose initial exposure energy is $D_4$ (25) has not been accumulated to the amount of full exposure (only $D_4+IE_1+IE_2$)(25"), as shown in FIG. 2(c)/(d);

6. using the same developer solution as that of step 3 to develop and to remove the photoresist of the region achieving full exposure (24") to thereby cause the corresponding area of the electrically conductive substrate of underlying the photoresist to be uncovered and electrodepositing said region with a color electrodeposition coating containing an anionic electrodeposition resin having a low acid value, namely, conducting the electrodepositing arrangement of the third pixel (28), as shown in FIG. 2(c)/(d);

7. exposing the entire surface of the substrate with an energy $IE_3$ to impart an incremental amount of energy to all regions of the substrate, wherein $IE_3$ is the energetic difference between $D_3$ namely, $IE_3=D_3-D_4$), and $D_4$, at this moment, the exposure energy of the region whose initial exposure energy is $D_4$ (25) has been accumulated to the amount of full exposure $(D_4+IE_1+IE_2+IE_3=D_1)$ (25'''), and then using the same developer solution as that of step 3 to develop and to remove the photoresist of the region achieving full exposure (25''') to thereby cause the corresponding area of the electrically conductive substrate of underlying the photoresist to be uncovered, and coating said region with a layer of black resin, shining a UV light onto the back side of said conductive substrate so as to cure the black-hued matrix (29) filled in holes of the region under a shielding effect provided by said cured resins (26, 27, 28); the kinds of the materials forming the black-hued matrix and the ways to produce the same can comprise the following three: (1) employing a heat-curable positive photoresist dispersed with black coloring agents and using the region which has the less initial exposure energy to form black-hued matrix thereon, (2) employing a black electrodeposition resin which is of the same type as that contained in the electrodeposition coating and utilizing an electrodepositing method to arrange the black electrodeposition resin on a electrically conductive substrate, (3) employing a photosensitive black electrodeposition resin and baking the substrate at elevated temperature to cure the pixels (26, 27, 28) and the black-hued matrix (29) completely, as shown in FIG. 2(e);

8. finally, forming an overcoat (30) on the substrate to protect the colored filter, as shown in FIG. 1A(f) and FIG. 2(f).

The examples of the present invention are described below. It is believed that the other purposes, characteristics and advantages of the present invention can be more definitely understood through the illustration of the examples.

EXAMPLES

Example 1

Synthesis of Polyester Resin Having a Low Acid Value

Using a conventionally known esterifying condensation polymerization to carry out the synthesis of a polyester resin of low acid value. The species and amounts of the monomers and solvents used are as below:

| Components | Amount, wt % |
| --- | --- |
| neopentyl glycol | 24.53 |
| adipic acid | 3.25 |
| isophthalic acid | 7.95 |
| isodecanol | 14.40 |
| trimellitic anhydrate | 25.81 |
| buytyl cellosolve | 5.00 |
| 2-butanol | 20.00 |

Place the chemical reagents as indicated above into a reactor. Stir the mixture under a nitrogen atmosphere at elevated temperature to carry out the reaction. After esterification and dewatering under reduced pressure, the polymerization is finished. The analytical results of the resin solution obtained are below:

| | |
| --- | --- |
| non-volatile components (150° C. 1 hr. wt %) | 75.4 |
| low acid value (mg KOH/g, solid) | 48.7 |
| viscosity (25° C., cps) | 45.2 |

Example 2

Production of the Electrodeposition Coating Containing Polyester Resin Having a Low Acid Value The species and amounts of the components of the electrodeposition coating containing a polyester resin of low acid value are as below:

| Components | A-1 | A-2 | A-3 |
| --- | --- | --- | --- |
| anionic polyester resin | 95.0 | 95.0 | 95.0 |
| melamine resin Nikarakku ® MX-40) | 8.0 | 8.0 | 8.0 |
| 2-ethoxy ethanol butyl ether | 25.0 | 25.0 | 25.0 |
| 2-ethoxy ethanol ethyl ether | 5.0 | 5.0 | 5.0 |
| neobutanol | 18.0 | 18.0 | 18.0 |
| triethylamine | 2.5 | 2.5, | 2.5 |
| deionized water | 813.5 | 813.5 | 813.5 |
| phthalocyanine blue (SR-1500) | 5.0 | — | — |
| phthalocyanine green (SAX) | — | 5.0 | — |
| azo lake pigment (CARMINE FB) | — | — | 5.0 |
| total | 1000 | 1000 | 1000 |

Use the following steps to prepare the electrodeposition coating containing polyester resin having a low acid value:

1) weight the anionic polyester resin, melamine resin (Nikarakku® MX-40), 2-ethoxy ethanol butyl ether, 2-ethoxy ethanol ethyl ether, neobutanol and triethylamine with the amounts shown in the above, place the reagents into a container, and mix them under stirring;
2) weight the pigments with the amounts shown in the above, add them into the mixture, and mix them under stirring;
3) milling-disperse the mixture with a mill, the milling beads used have an average particle size of from 0.8 to 1.2 μm;
4) add deionized water under stirring and emulsify the mixture; and
5) filter the mixture with a filter of 5 μm.

Example 3

A positive photoresist of 2.2 μm thick and corresponding to a weak basic developer solution as disclosed in U.S. Pat. No. 5,645,970 was formed on an electrically conductive transparent glass substrate, which was measured 0.7 mm in thickness and contains a pre-arranged black-hued matrix. A photomask with merely one-third light-transmitting area was used by carefully moving to conduct the energy exposure of 250, 150 and 50 mJ/cm$^2$ respectively (100%, 60% and 20%) to form three regions of different initial exposure energies.

A developer solution containing 0.5% $Na_2SiO_3$ was used to develop and to remove the 250 mJ/cm$^2$ initial exposure region (i.e., 100% initial exposure region). Therefore, a resin containing a red pigment was electrodeposited onto the expose surface of the conductive substrate. The electrodeposition process was conducted at 25° C. at an electrical voltage of 50 V, for 20 seconds. After the electrodeposition process was accomplished, the substrate was washed with deionized water and the substrate was dried at 90° C. for 10 minute. The entire photoresist was then exposed to a light source to receive 100 mJ/cm$^2$ incremental exposure energy. This caused the cumulative exposure energy in the second (initially 100 mJ/cm$^2$, or 60% initial exposure energy) and third (initially 50 mJ/cm$^2$, or 20% initial exposure energy) to raise to 250 mJ/cm$^2$ (full exposure) and 150 mJ/cm$^2$ (60% of full exposure), respectively. Similarly, the same developer solution containing 0.5% $Na_2SiO_3$ was then used to develop and to remove the full exposure region. This was followed by electrodepositing under a similar condition a resin containing a green pigment onto the expose surface of the conductive substrate and which was then dried it. Again, the entire photoresist was exposed to a light source to receive another 100 mJ/cm$^2$ of incremental exposure energy. This caused the cumulative exposure energy in the third to raise to 250 mJ/cm$^2$ (100% exposure). The region was developed and removed using the same developer solution containing 0.5% $Na_2SiO_3$. This was again followed by electrodepositing under a similar condition a resin containing a blue pigment onto the expose surface of the conductive substrate. Finally, the entire photoresist was exposed to receive another 100 mJ/cm$^2$ of exposure energy then removed using the same developing solution containing 0.5% $Na_2SiO_3$. To ensure complete curing of all the colored layers, the whole plate was heated at 260° C. for one hour. The arrangement of the three pixels, red, green and blue is finished.

The foregoing description of the preferred embodiments of this invention has been presented for purposes of illustrated and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairy, legally, and equitably entitled.

What is claimed is:

1. A method for manufacturing color filters comprising the steps of:
   (a) coating a layer of positive photoresist onto a transparent electrically conductive substrate, and exposing the positive photoresist layer to form three or four regions of different initial levels of exposure energy, wherein the exposure energy of each region is $D_1$, $D_2$, $D_3$ (and $D_4$) progressively, $D_1$ represents the full exposure energy of the positive photoresist, and $D_1 > D_2 > D_3$ ($> D_4$);
   (b) using a developer solution to develop and to remove the region of the photoresist layer with the exposure energy of $D_1$ to thereby cause a corresponding area of the electrically conductive substrate underlying the photoresist to be uncovered, and electrodepositing said region with a color electrodeposition coating containing a low acid value anionic electrodeposition resin having an acid value of lower than 70 mg KOH/g so as to finish a pixel arrangement of a desired color;
   (c) exposing the entire surface of the substrate with an energy $IE_n$ to impart an incremental amount of energy to all regions of the substrate, wherein $IE_n$ is the energetic difference between $D_n$ and $D_{n+1}$ and the definition of n is below:
      (i) when three regions of different initial levels of exposure energy are formed on the substrate, n is 1 and 2 progressively, or
      (ii) when four regions of different initial levels of exposure energy are formed on the substrate, n is 1, 2 and 3 progressively;
   (d) after each time of exposure in steps (c)(i) or (ii), using the same developer solution of step (b) to develop and to remove the photoresist of the region achieving full exposure to thereby cause the corresponding area of the electrically conductive substrate of underlying the photoresist to be uncovered, and then electrodeposition said region with a color electrodeposition coating containing an anionic electrodeposition resin having a low acid value to finish the pixel arrangements of other desired colors;

(e) repeating steps (c) and (d) until all of the pixel arrangements are accomplished; and (f) forming an overcoat on the substrate.

2. A method for making color filters according to claim 1, wherein the low acid value anionic electrodeposition resin is a polyester resin having carboxyl groups.

3. A method for making color filters according to claim 1, wherein the low acid value anionic electrodeposition resin has a acid value of from 20 to 70 mg KOH/g.

4. A method for making color filters according to claim 1, wherein the anionic electrodeposition resin further comprises a crosslinkable curing agent, an organic solvent, a neutralization agent or a coloring agent consisting of a dye, a pigment, or a mixture thereof.

5. A method for making color filters according to claim 4, wherein the crosslinkable curing agents is selected from the group consisting of methylation melamine resin, butylation melamine resin, methylation methanol melamine resin, butylation methanol melamine resin, benzoguanamine resin and mixtures thereof.

6. A method for making color filters according to claim 4, wherein the pigment is selected from the group consisting of azo lake organic pigments, quinacridone organic pigments, phthalocyanine organic pigments, isoindolinone organic pigments, anthraquinone organic pigments, thioindigo organic pigments, chrome yellow, chrome blue, iron oxide, chrome vermilion, chrome green, ultramarine, prussian blue, cobalt green, emerald green, titanium white, carbon black, and mixtures thereof.

7. A method for making color filters according to claim 4, wherein the dye is selected from the group consisting of azo dyes, anthraquinone dyes, benzodifuranone dyes, condensed methine dyes, and mixtures thereof.

8. A method for making color filters according to claim 1, wherein when three regions of different initial levels of exposure energy are formed on the substrate, $D_1$, $D_2$ and $D_3$ represent from 100% to 40%, from 85% to 20% and from 70% to 0%, respectively.

9. A method for making color filters according to claim 8, wherein $D_1$, $D_2$ and $D_3$ represent from 100% to 70%, from 70% to 40% and from 40% to 0%, respectively.

10. A method for making color filters according to claim 1, wherein when four regions of different initial levels of exposure energy are formed on the substrate, $D_1$, $D_2$, $D_3$ and $D_4$ represent from 100% to 40%, from 85% to 20%, from 70% to 5% and from 50% to 0%, respectively.

11. A method for making color filters according to claim 10, wherein when four regions of different initial levels of exposure energy are formed on the substrate, $D_1$, $D_2$, $D_3$ and $D_4$ represent from 100% to 80%, from 80% to 50%, from 50% to 30% and from 30% to 0%, respectively.

12. A method for making color filters according to claim 1, wherein step (a) comprises a single exposure step using a photomask having multiple exposure density; or using a photomask having a predetermined exposure pattern by careful movements of the photomask to form regions of different degrees of exposure energy on the photoresist of the substrate; or using a plurality of photomasks to form the desired three regions of different degrees of initial exposure energy form regions of different degrees of exposure energy on the photoresist of the substrate.

13. A method for making color filters according to claim 1, wherein the developer solution of step (c) is selected from the group consisting of the aqueous solutions of sodium carbonate, sodium hydrogen carbonate, sodium silicate, tetraalkyl amine compounds, sodium hydroxide, potassium hydroxide, and mixtures thereof.

14. A method for making color filters according to claim 1, wherein in step (e) the substrate is selectively or progressively coated with the color electrodeposition coating containing red, green and blue.

15. A method for making color filters according to claim 1, wherein when three regions of different initial levels of exposure energy are formed on the substrate, the substrate is pre-arranged with a black-hued matrix.

16. A method for making color filters according to claim 15, wherein the materials of forming the black-hued matrix are alloys or oxides of chromium and/or nickel, or mixtures thereof, or organic polymeric coating compositions containing black pigments dispersed therein or non-electrically conductive materials.

17. A method for making color filters according to claim 1, wherein when four regions of different initial levels of exposure energy are formed on the substrate, a black resin is coated onto the last region of the substrate and steps (c) and (d) are repeated to complete the electrodeposition of all colors.

18. A method for making color filters according to claim 1 further comprising baking the substrate again after step (e) in order to cure the electrodeposition resins of all colors completely.

* * * * *

UNITED STATES PATENT AND TRADEMARK OFFICE
CERTIFICATE OF CORRECTION

PATENT NO. : 6,110,625
DATED : August 29, 2000
INVENTOR(S) : Wen et al.

It is certified that error appears in the above-identified patent and that said Letters Patent is hereby corrected as shown below:

Title page, [73] Assignees, the second Assignee's name, "Sumitomo Chemical Company, Ltd., Tokyo, Japan" should read --Sumitomo Chemical Company, Limited, Osaka, Japan--.

Title page, [57] ABSTRACT, line 23, after "manufacture" insert --of--.

Column 11, in the table, first column, line 3, "Nikarakku" should read --(Nikarakku--; 3rd column, line 7, "2.5," should read --2.5--.

Column 12, line 62, after "substrate" cancel "of".

Column 13, line 9, "a" should read --an--; line 16, "agents" should read --agent--.

Column 14, line 14, "form" should read --from--; line 31, after "materials" cancel "of".

Signed and Sealed this

First Day of May, 2001

*Attest:*

NICHOLAS P. GODICI

*Attesting Officer*  *Acting Director of the United States Patent and Trademark Office*